United States Patent [19]

Joyce

[11] 4,084,865
[45] Apr. 18, 1978

[54] UTILITY CONTAINER

[76] Inventor: James E. Joyce, 878 Darien Cir., Rochester, Mich. 48063

[21] Appl. No.: 735,845

[22] Filed: Oct. 26, 1976

[51] Int. Cl.$^2$ .................. B65D 43/12; B65D 1/24
[52] U.S. Cl. .................................. 312/111; 206/387; 220/22; 312/DIG. 33
[58] Field of Search ............... 312/108, 111, DIG. 33; 220/20, 19, 345, 351; 206/315 R, 373, 387

[56] References Cited

U.S. PATENT DOCUMENTS

| | | | |
|---|---|---|---|
| 3,288,319 | 11/1966 | Cahill | 312/111 |
| 3,827,570 | 8/1974 | Betts | 220/22 |
| 3,897,885 | 10/1975 | Joyce | 206/387 |
| 3,907,116 | 9/1975 | Wolf et al. | 206/387 |
| 3,967,869 | 7/1976 | Jackson | 312/DIG. 33 |

Primary Examiner—Casmir A. Nunberg
Attorney, Agent, or Firm—Krass & Young

[57] ABSTRACT

A utility container comprising a container body, a plurality of drawers, a plurality of drawer guide inserts and a slide cover, the slide cover being substantially biplanar to enclose the front and top of the container body, one edge of the cover being wrapped around the rear panel of the container body and the other edge being wrapped around the bottom of the container body to limit displacement of the cover relative to the container to a lateral sliding displacement, and the plurality of drawers and drawer guide inserts being easily removed and rearranged or replaced with a recording tape cassette or cartridge storage insert. Two or more such containers may be stacked on one another by way of a slot and raised rear wall member. In addition, the drawers may be individually removed and temporarily stacked in the top of the container rear wall for improved access to contents. The cover may be locked.

30 Claims, 13 Drawing Figures

UTILITY CONTAINER

BACKGROUND OF THE INVENTION

1. Field of the Invention

This invention relates to multi-purpose storage containers usable as a tool box, sewing box, jewelry box, notion box, fishing tackle box, recording tape cartridge or cassette storage container and the like and particularly to such containers that may be variously internally structured according to the preference of the individual user.

2. Prior Art

The prior art teaches of multitudinous variations of many different kinds of storage containers. Almost universally, existing container designs are limited in function and thus have little or no utility when employed for other than their intended application.

Tool boxes, for example, generally comprise a rectangular metal or plastic body with a hinged top. A small parts tray, typically nests within the body and must be removed to obtain access to the larger tools stored beneath. This necessity of removing the tray and setting it down to gain access, coupled with lack of internal compartmentalization, makes most portable tool boxes inefficient to use.

Fishing tackle boxes suffer from many of the infirmities of the tool boxes. Additionally, as exemplified in U.S. Pat. No. 3,600,840, fishing tackle boxes typically employ several trays which are pivotally or slidably interconnected by linkage. This type of construction is relatively expensive and heavy. Additionally, the pivoting tray design inherently restricts access to the lower compartment and permits use only when fully open and susceptible to the elements. Typically, a carrying handle is mounted to the top, requiring that the box be set down and opened, being extremely difficult to use while held.

Even "multipurpose" storage containers are generally intended and designed for one specific application; i.e., to hold items of a particular size. Although they often are light weight and inexpensive, such containers are not structurally sound so as to be portable and lockable in a meaningful way. Additionally, if they have sliding or moving parts, they are typically of low quality and do not lend themselves to multipurpose use and internal restructuring by the user.

This invention has the same general external appearance as the invention disclosed in my U.S. Pat. No. 3,897,885 for a Cassette Storage Unit with Sliding Cover which was granted Aug. 5, 1975. The current invention represents an improvement over that in U.S. Pat. No. 3,897,885 in the bearing surface design for the sliding cover. The thrust of my present invention, however, is to improve upon multi-purpose utility storage containers in general.

It is clearly desirable to provide a utility container having the strength and structural integrity of the steel tool box and the storage capacity of the fishing tackle box without the associated weight, complexity and cost thereof. It is also desirable to include features such as stackability of units, a high degree of portability and a design that allows the user to readily reconfigure the container as his needs dictate. It is to this area that the present invention is addressed.

BRIEF SUMMARY OF THE INVENTION

The present invention contemplates a multi-purpose (internally alterable) utility storage container comprising a container body which has laterally opposite side panels and at least one body panel which is disposed perpendicularly to and integral with the side panels. The body panel(s) hold the side panels in a spaced and substantially parallel relationship. The container also comprises a movable cover which opens and closes the container in cooperation with the container body, and means integral with the side panels and the interior of the body for receiving various combinations of removable inserts and drawers. The inserts can be in various configurations and function as internal partitions, drawer supports, spacers and the like.

In the preferred embodiment the back member is reinforced by a number of rearwardly facing integral ribs which run around the periphery of the back member as well as being intermediately spaced horizontally and vertically.

In the preferred embodiment the back member additionally has a downward facing slot which is slightly wider than the thickness of that portion of the back member that projects above the uppermost part of the side panels and is slightly less deep than the amount the height of the back member exceeds that of the side panels. This allows stacking in a vertical array two or more containers with the uppermost portion of the back member of one mating with the slot of the next higher container in the array. While so interconnected, the cover of any container can be opened and the contents made accessible or the cover can be closed and individually locked.

The preferred embodiment is hereinafter described in several alternative configurations contemplating various insert and drawer designs which are far from exhaustive. In one configuration, the container body can be used without any inserts or drawers as a tool box or the like. In another configuration a recording tape cartridge or cassette storage tray capable of independent use can be inserted in the container body. Another alternative is to install inserts in the wrap-arounds associated with the side panels and install cooperating "full size" drawers which substantially fill the volume defined by the container body and cover. Still another alternative is to install only one insert in the wrap-arounds associated with one of the two side panels, install another partitioning insert intermediately between the side panels to subdivide the volume defined by the container body and cover, said partitioning insert having drawer bearing surfaces facing that side panel with the insert, then install "partial" drawers of appropriate length to fill only the volume between the partition insert and the side panel having the other insert, leaving the remaining volume open.

The preferred embodiment has several additional optional features such as integral provisions for locking means, keyhole bosses which allow for wall mounting and serve to lock mating containers together when in a vertical array, a compartment for storage (in the alternative where two inserts associated with the side panels are employed) defined by the bottom surface of the lowermost drawer and the top surface of the bottom of the container body, and a rear compartment for storage which is formed and defined by the hinged attachment of a rear compartment hatch to the lowermost extension of said rearward facing reinforcement ribs and further defined by the rearwardmost surface of the rear panel of the container body and the inside surface of the rearwardly facing peripheral ribs.

Other objectives and advantages of the present invention will be made apparent from the following detailed description of a preferred embodiment of the invention. The invention makes reference to the accompanying drawings.

DETAILED DESCRIPTION OF THE SPECIFIC EMBODIMENT

Figures 1, 2, 4:
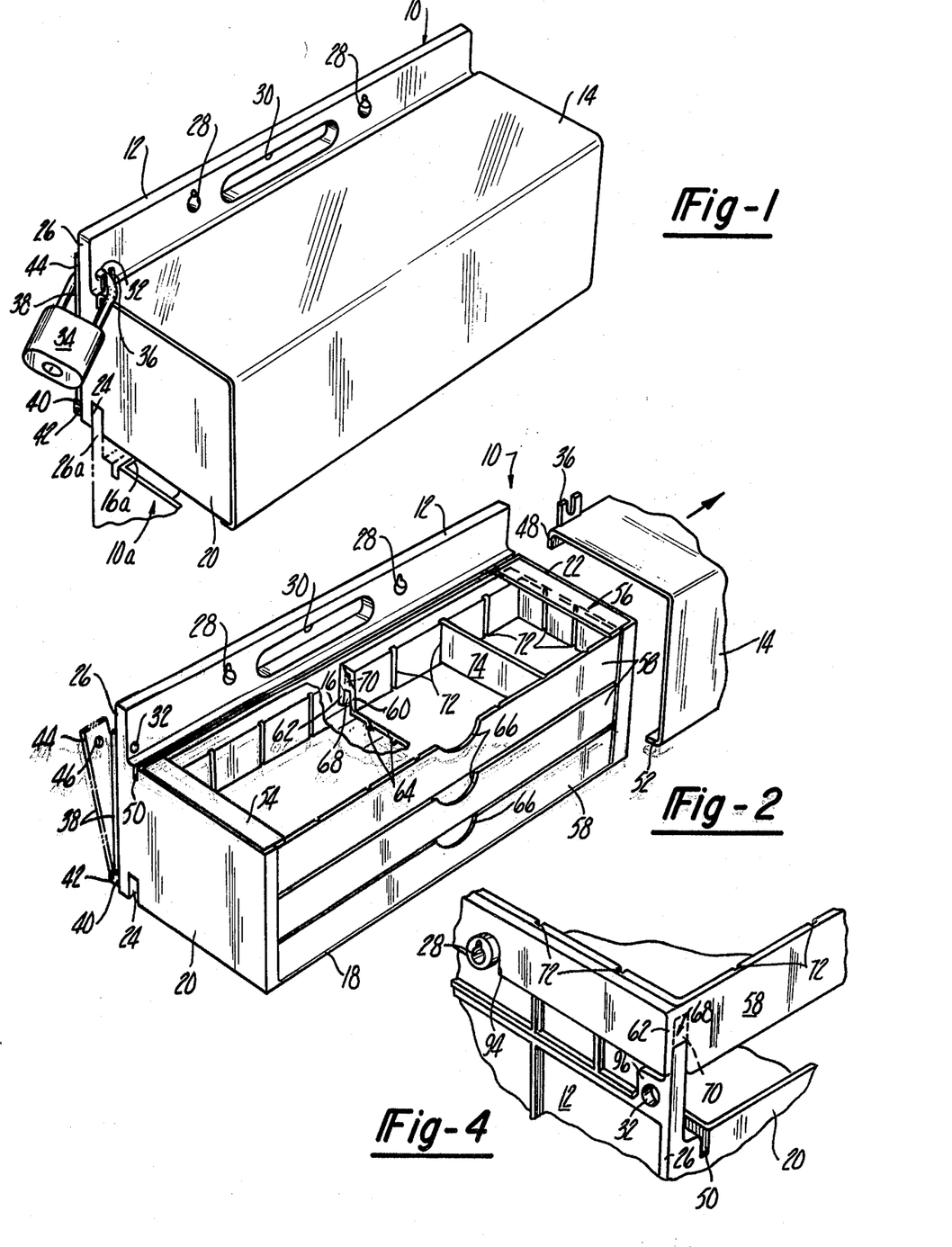
FIG. 1 is a perspective view of the fully assembled storage container in a stacked vertical array illustrating a method of locking same.
FIG. 2 is a perspective view of the storage container with the cover removed, the rear compartment hatch partially open and in the alternative configuration employing inserts which cooperate with the two side panels and "full size" drawers with cutaway details.
FIG. 4 is a perspective cutaway view showing the stacking of a drawer on the part of the upstanding back member that exceeds the height of the side panels.

Referring to FIG. 1, a multipurpose (internally alterable) utility storage container 10 constituting a preferred embodiment comprises the combination of a molded plastic container body 12 and a molded plastic cover 14 slidably disposed on the body 12 for selective access to the interior thereof. Container body 12 includes an upstanding back member 26 (shown also as 26a in a stacked array), a rear panel 16 (also shown as 16a in the stacked array), a horizontal floor 18 and a pair of laterally opposite side panels 20 and 22. The rear panel 16, floor 18 and side panels 20 and 22 are all integrally molded to form a container body 12 which is substantially open to the top and front when the cover 14 is removed permitting access to the contents thereof. Accordingly, the container may be wall mounted at eye level without sacrificing the capability of easy visual identification of the contents of the container.

In the specific embodiment of the container body 12 shown in the drawings, a stacking and hanging capability is provided by means of a rib reinforced upstanding back member 26 which is formed integrally with the container 12 and which, as shown in FIGS. 1-4, 7 and 9, extends vertically above the uppermost part of the side panels 20 and 22 by approximately one and one-half inches. The back member 26 is integral with but spaced from the rear wall 16 at the lower end thereof to define a vertical slot 24 which extends fully across the bottom of the container and is adapted to receive the upper portion of the back member 26a of another similar utility container unit 10a. In this manner, a plurality of utility containers 10 may be stacked vertically one on top of another in such spaced relationship as to permit each of the units of the stacked array to be easily opened for access to the interior thereof. In addition, the upstanding back member 26 is provided with a pair of spaced integral keyhole bosses 28 so as to permit the utility container 10 to be suspended by means of hooks and the like. Finally, an elongated carrying aperture 30 is provided between the hanging apertures 28 so as to permit the unit 10 to be easily carried from place to place.

The upstanding back member 26 has an additional aperture 32 to accommodate locking means 34. Additionally, the cover 14 has an integral bifurcated boss 36 which indexes with the aperture 32 when the cover is closed permitting locking of the cover to prevent lateral displacement thereof. A rear compartment hatch 38 is pivotably attached to back member 26 by two hinge tabs 40, which are integrally molded to the lower rearwardmost corners of the back member 26. The hatch 38 is a planar molded plastic member of approximately the same shape and dimensions as the rear panel 16 of the container body 12. Two integral hinge nibs 42 are located on the lowermost laterally opposed edge surfaces of the hatch 38 and cooperate with the two hinge tabs 40 forming a hinge. Additionally, the hatch 38 has an integral lock extension part 44 which aligns with the part of the back member 26 having the locking aperture 32. A hatch locking aperture 46 in the lock extension part 44 indexes with the locking aperture 32 in the back member 26 when the hatch 38 is closed. Thus, when the hatch 38 and the cover 14 are closed, a single locking means 34 secures them both.

Referring to FIG. 2, the cover 14 is removed to illustrate internal detail of the utility storage container 10. Additionally, the rear hatch 38 is shown in phantom both in the closed position and the partially open position to further illustrate the details of the lock extension part 44 and the hatch locking aperture 46. Referring now to the cover 14 in greater detail, it can be seen from the FIGURES that the cover 14 is substantially biplanar, the top and front portions thereof being integral but lying in separate planes perpendicular to each other. The cover 14 is of such height, depth, and width as to substantially enclose the top and front of the container body 12 between the side panels 20 and 22 when in the fully closed position. The inboard edge of the top of cover 14 is bent at an angle of 90° to form a lip 48 of approximately one-quarter inch in depth and extending laterally between the opposite lateral extremes of the cover 14. Lip 48 is disposed in a guide groove 50 to support the cover 14 relative to the container body 12 and also to prevent removal thereof by displacement of the cover 14 forwardly of the container body 12. The front plane portion of the cover 14 is bent back over its entire lateral length to define a second lip 52 which wraps around the bottom or floor 18 so as to prevent removal thereof by displacement of the cover 14 upwardly from the container body 12. Accordingly, the lips 48 and 52 act as guides and bearings and prevent displacement of the cover 14 relative to the container body 12, except for lateral sliding displacement. Although the lips 48 and 52 are shown as continouous in fashion, they may, of course, be intermittent or discontinuous in configuration.

FIG. 2 illustrates one of the configurations in which the preferred embodiment of the utility container 10 can be used, employing two drawer inserts 54 and 56 which are slidably retained by certain internal features of the container body 12, the details of which will be described in detail below. The inserts 54 and 56 provide bearing surfaces for three "full size" drawers 58 of equal size which are open at the top and have a bottom that is slightly smaller dimensionally than the floor 18 of the container body 12. Each drawer 58 comprises said bottom and integral upstanding front wall, back wall and laterally opposed side walls. Each drawer 58 is molded plastic. In the closed position, the three drawers 58 are stacked vertically, spaced by the bearing surfaces of the inserts 54 and 56, having a combined vertical wall height of slightly less than the height of the side panels 20 and 22. Each drawer 58 has two parallel reinforcing ribs 64 that run laterally along the underside of the drawer bottom continuously for the entire width of the drawer except for the beginning and ending one half inch, at each end of each drawer. The rib is eliminated at each end of the drawer bottom to provide a surface that slidingly cooperates with the corresponding bearing surfaces of the inserts 54 and 56. It is contemplated that the ribs could be formed inside the drawer without affecting the operation or spirit of the present invention. Each drawer 58 has a semi-circular relief 66 centered on the top edge of its front wall to serve as a drawer pull handle by insertion of the user's finger into the relief 66 and pulling the drawer outwardly. A handle of this type is extremely efficient in not requiring any additional machining operations nor wasting space within the storage container 10. The back wall of each drawer 58 has two members, an inner member 60 and an outer member 62 that are substantially parallel and are bridged at their topmost parts forming a downward opening U-shaped channel 68 that runs laterally the entire length of the back wall of the drawer 58. The U-shaped channel 68 is reinforced by five webs 70 spaced along the channel. The U-shaped channel 68 associated with each drawer 58 is slightly wider than the thickness of the back member 26 of the container body 12 so that any single drawer can be slidably removed from its closed position and stacked on top of the back member 26 for access thereto. While so stacked, the cover 14 can be closed to protect the contents of the two remaining drawers 58. Each drawer has a plurality of spaced vertical slots 72 around the inside perimeter of the front, rear and side walls intended to receive partitions 74 that are readily changed or added to. The illustrated partition 74 is only intended as an example of the great number of combinations that could be employed including front to rear and/or lateral partition configurations.

Figures 3, 5, 7:
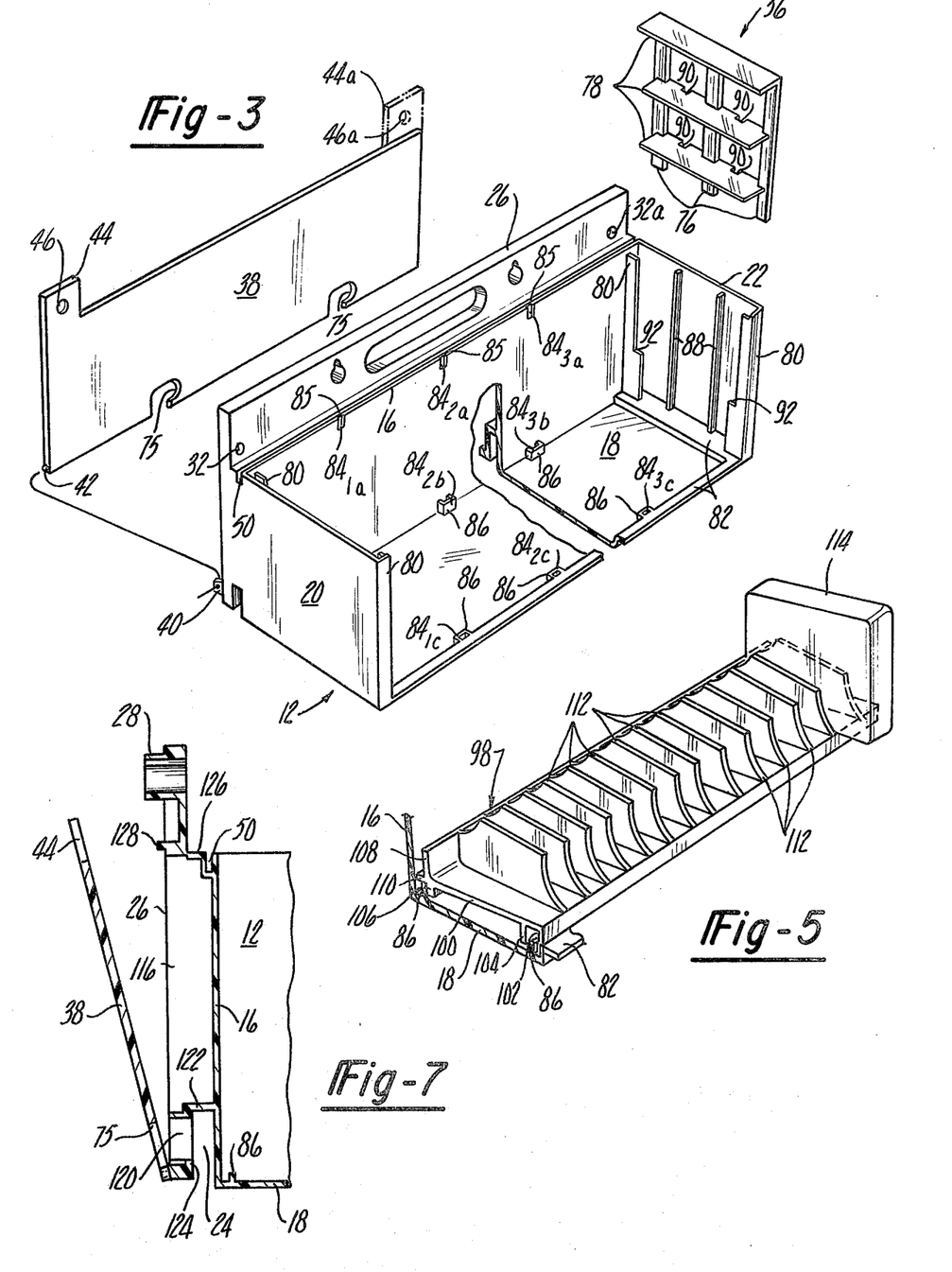
FIG. 3 is a perspective exploded view, illustrating the relative positioning and details of the container body, the rear compartment hatch and an insert of the type which is associated with a side panel.
FIG. 5 is a perspective view of the tape cartridge insert illustrating its placement in the container body in a broken sectional view.
FIG. 7 is a broken sectional side view of the container and rear compartment hatch illustrating back member and rear compartment detail from FIG. 6.

Referring to FIG. 3, the container body 12, rear compartment hatch 38 and drawer guide insert 56 are shown in exploded view to further illustrate details. The lock extension part 44 and corresponding hatch locking aperture 46 and container body locking aperture 32 are shown in their preferred locations as well as in an alternate location in phantom (labeled 44a, 46a and 32a respectively) in the upper right hand corner of the hatch 38 and back member 26. The lock extension part 44a, the hatch locking aperture 46a and the locking aperture 32a cooperate with each other in the same manner as does the preferred embodiment described above. Two L-shaped reliefs 75 are provided, spaced along the bottom edge of the hatch 38, to provide clearance for the heyhole bosses of another utility container 10a upon which the subject container is being stacked. The L-shaped relief 75 is large enough for the rear compartment hatch 38 to be fully pivotably opened in the stacked configuration without binding on the keyhole boss 28 of the next lower storage container 10 which projects through it. Additional detail of function of the keyhole bosses 28 in the stacking of the storage container 10 will be given below.

The drawer guide insert 56 comprises three linearly spaced elongated vertical parts 76 and three planar horizontal runners 78 which are vertically spaced interconnecting said vertical parts 76. The vertical edges of the side panels 20 and 22 terminate integrally in wraparounds 80, said wrap-arounds corresponding with each side panel cooperating with each other to slidably receive downwardly the drawer guide insert 54 and 56 which is associated with that panel. When installed, the drawer guide inserts 54 and 56 are limited to upward displacement and the horizontal runners 78 are projecting inwardly within the container body 12. The laterally disposed legs of the wrap-arounds 80 associated with the rearwardmost vertical edge of the side panels 20 and 22 are actually an integral part of the rear panel 16 of the container body 12. When both drawer guide inserts 54 and 56 are installed the horizontal runners 78 will serve as bearing sufaces for the respective lateral ends of "full size" drawers 58. The uppermost drawer 58 is inserted between the lower surface of the uppermost runners 78 and the upper surface of the middle runners 78 of inserts 54 and 56. The middle drawer 58 is inserted between the lower surface of the middle runners 78 and the upper surface of the lowermost runners 78 of the inserts 54 and 56. The lowermost drawer 58 is inserted between the lower surface of the lowermost runners of inserts 54 and 56 and an elevated bearing surface 82, an integral part of the floor 18 of the container body 12 which effectively recesses substantially all of the surface of the floor 18 by one-quarter inch below the bearing surface 82. The lowermost drawer 58 is supported on the bottom surface of its lateralmost ribs 64 rather than on its bottom as are the other drawers. This support is provided by the elevated bearing surface 82 which extends inwardly further than do the runners 78 of the inserts 54 and 56, being necessary to provide clearance for the ribs 64 over the frontmost part of said bearing surface 82. When fully inserted between the proper runners 78, the three drawers 58 are restricted to a forward displacement and would resemble the configuration illustrated in FIG. 2. The upper surface of the upper runners 78 are substantially flush with the upper edge of the rear panel 16 and the side panels 20 and 22 of the container body 12 thereby preventing foreign bodies from falling between the drawer sides and the inside surfaces of the side panels 20 and 22. Said upper runners 78 serve also to protect the corners of the drawers 58 from damage and furthermore provide an improved bearing surface for the cover 14, restricting the inserts 54 and 56 and the drawers 58 from any displacement when the cover 14 is closed. In this fully assembled configuration, there is a storage space between the bottom surface of the lowermost drawer 58 and the upper surface of the recessed floor 18 of the container body 12. The elevated bearing surface 82 encompasses the peripheral front and laterally opposed sides of the floor 18 of the container body 12. The recessed floor 18 not only provides for storage of flat articles beneath the lowest drawer 58, the step between the bearing surface 82 and the floor 18 adds substantial rigidity to the overall storage container 10 without sacrificing space or adding undue weight.

Another alternative application of the storage container 10 is accomplished by removal of the drawers 58 and drawer guide inserts 54 and 56 and use of the container body 12 and cover 14 without any form of internal subcompartmentalization as a tool box, carrying case for portable electronic equipment, or the like.

Two additional alternative applications that will be disclosed in detail below dictate employing additional means within the interior of the container body 12 for slidably receiving removable inserts. These means comprise three laterally spaced planar sets of partition tab receiving slots 84. Each set of receiving slots 84 comprises three slots (for example $84_{3a}$, $84_{3b}$ and $84_{3c}$) each of which receive a tab which is integral with a planar partition which is substantially parallel to and of substantially the same dimensions as the side panels 20 and 22 of the container body 12. The details of the partition and its mating with said receiving slots 84 will be discussed in detail below. Continuing the example, receiving slot $84_{3a}$ is a slot in the forwardmost part of the upper edge and the uppermost part of the forwardmost surface of the rear panel 16 of the container body 12. The slot $84_{3a}$ is not formed entirely through the rear panel 16, a membrane-like wall 85 is retained as will be more clearly illustrated below. Slot $84_{3b}$ is formed by a boss 86 C-shaped in cross-section when viewed downwardly, which is integral with and common to the rear panel 16 and the floor 18, the open part of the "C" facing outwardly. Slot $84_{3c}$ likewise is formed by a C-shaped boss 86 which faces outwardly and is common to and integral with the step from the floor 18 to the elevated bearing surface 82 and the floor 18, the "C's" open part facing outwardly. The bosses 86 are the same height as the step between the bearing surface 82 and the floor 18 of the container body 12. It is contemplated that the bosses could be shorter than the height of the bearing surface 82 or even more simply, spaced apertures in the bottom 18 of the container body 10.

Two vertical stiffening ribs 88 which project inwardly are spaced along the inside surface of each of the two side panels 20 and 22. Corresponding notches 90 are made in the outsidemost edge of the center and lower runners 78 of the inserts 54 and 56 appropriately spaced as to prevent interference with said ribs 88. The bottom surface of the uppermost runners 78 abut with the ends of the ribs 88 and the inside legs of the wrap-arounds 80. The bottom surface of the lower runners 78 abut with dog legs 92 in the inside legs of the wrap-arounds 80.

Referring to FIG. 4, a partial broken view of a drawer 58 stacked upon the back member 26 of the container body 12 is illustrated. Although the U-channel 68 is substantially as deep as the back wall's outer and inner members 60 and 62 are high, the back member 26 only penetrates the channel 68 sufficiently to abut the lowermost surface of the spaced webs 70. The webs 70 not only provide support for the drawer 58 in the stacked position, they also lend structural support to the drawer 58 at all times while minimizing weight and space requirements. An inverted U-shaped relief 94 is provided in the lowermost edge of outer member 62 of each drawer 58 in two places, laterally spaced to allow the keyhole bosses 28 to protrude through while said drawer 58 is stacked upon the back member 26 of the container body 12. The locking hole 32 is reinforced by an integral square boss 96 on the rearwardmost side of the back member 26.

Referring to FIG. 5, an alternative application of the utility container as a recording tape cartridge storage device is illustrated. A recording tape cartridge insert 98 which comprises a base 100, lateral leg ribs 102, 104 and 106, a back part 108, a lateral rear positioning rib 110 and a plurality of vertical laterally-spaced dividers 112 which are spaced uniformly apart and which extend substantially parallel to the side panels 20 and 22 of the container body 12 when the insert 98 is installed within the container body 12, is designed to provide a useful function both when it is installed in the container body 12 and by itself. All of the component parts of the insert 98 are integrally molded of plastic or the like. The dividers 112 have a reduced sectional area to promote ease of access to the individual cartridges 114. FIG. 5 has a sectional view of the insert 98 in its intended position within the container body 12. The leg ribs 102, 104 and 106 run laterally continuously over the entire length of the insert 98 and project downwardly from the bottom of the insert base 100. The insert base 100 is slightly larger dimensionally than the recessed portion of the floor 18 of the container body 12. The front two leg ribs 102 and 104 are higher than the rear leg rib 106 so that the insert base 100 will tend to slope downwardly from front to rear both when the insert 98 is being used by itself (resting on the bottom surface of leg ribs 106 and 104 - leg rib 102 serves no function) or when installed in container body 12 (resting on the bottom surface of leg rib 102 and positioning rib 110). When in the installed configuration, the bottom surface of leg rib 104 serves no function, but its forwardmost vertical surface abuts with the rearwardmost surface of the three forwardmost C-shaped bosses 86 thereby preventing forward displacement of the insert 98 vis-a-vis the container body 12. In the installed configuration, leg rib 102 rests upon bearing surface 82 and the rearwardmost surface of the leg rib 106 abuts with the forwardmost surface of the rearwardmost C-shaped bosses 86. The back part 108 of the insert 98 is perpendicular to the base 100 and projects substantially upwardly about one half inch above the base 100. The dividers 112 are integral with both the base 100 (along their bottom edges) and the back part 108 (along their rearwardmost edges). The positioning rib 110 projects rearwardly from the back part 108 and abuts with the rear panel 16 preventing rearward displacement vis-a-vis the container body 16. The laterally opposed endmost surfaces of the insert 98 abut the inwardmost surface of the wrap-arounds 80 thereby preventing lateral movement of the insert 98. In light of the above, the insert 98 can only be removed upwardly. The base 100 is sloped rearwardly to cause the cartridges 114 it contains to tend to slide rearwardly and be retained by the insert 98. Because the cartridges 114 are tipped slightly (the top backmost corner is further rearward than the lower backmost corner), the positioning rib 110 must also serve to space the back part 108 of the insert 98 far enough away from the wall to accommodate this. This is shown more clearly in FIG. 12 which will be discussed in detail below. Additionally, locater nibs could be optionally added which are integral with the cassette and/or cartridge insert 98 which extend downwardly and are so spaced and dimensioned as to mate with respective C-shaped bosses 84$_b$ and 84$_c$, preventing the insert 98 from being disoriented with regard to the container body 12 during handling and shipment thereof.

Figure 6:
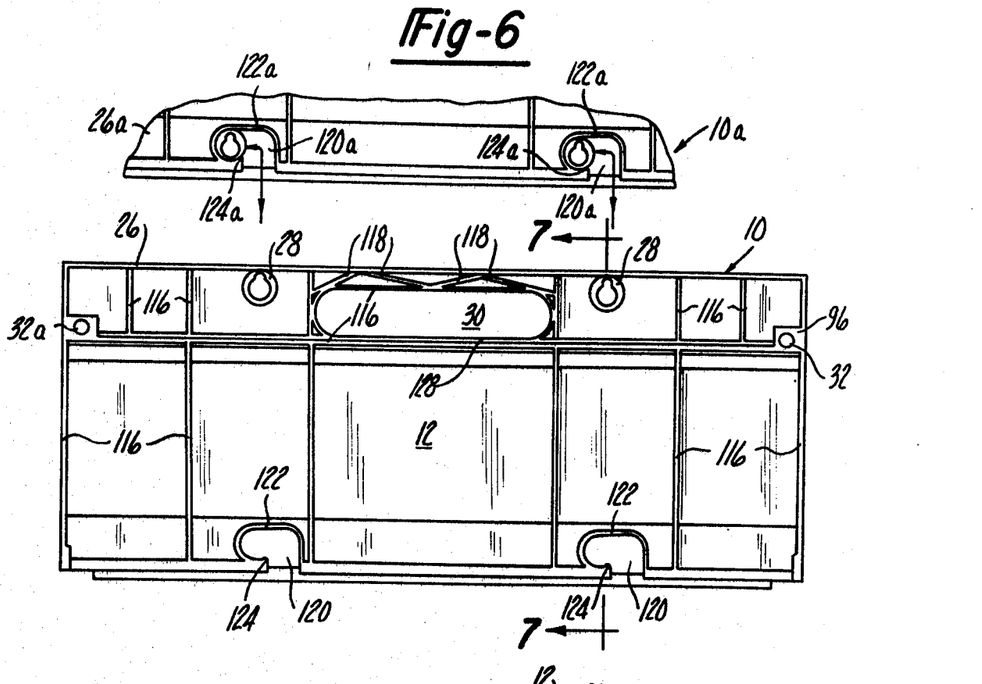
FIG. 6 is a rear plan view of the container body illustrating by broken view, interlocking of another container body in a vertical array.

Referring to FIG. 6, a rear view of the container body 12 shows the details of the reinforcing ribs of the back member 26 and the interlocking feature associated with the stacking of two of the storage containers 10 and 10a. A plurality of rearward facing integral ribs 116, spaced vertically and horizontally reinforce the back member 26 as well as the entire container body 12. Additional ribs 116 are spaced around the parameter of the back member 26 as well as around the carrying aperture 30. Supplemental ribs 118 triangulate the horizontal and vertical ribs 116 above the carrying aperture 30 to lend extra strength without adding excess weight.

Two L-shaped locking slots 120 are spaced along the lowermost edge of the back member 26, said slots 120 opening into the vertical stacking slot 24. Both slots 120 have rearwardly facing ribs 122 around and defining their periphery, said ribs 122 being integral with the back member 26. The mouth of each slot 120a is dimensioned to accept a keyhole boss 28 of the storage container 10 that is directly below, upon which it is going to stack. When the upper container 10a is stacked upon the lower container 10, the keyhole bosses 28 of the lower container 10 mate with their respective slots 120a of the upper container 10a, said bosses 28 project rearwardly through the slots 120a. When the upper portion of the back member 26 of the lower container 10 is fully inserted into the vertical slot 24 of the upper container 10a, the inside surface of the ribs 122a which are peripheral to the L-shaped slots 120a provide a bearing surface for the keyhole bosses 28 of the mating container 10. Once in this position, the two stacked containers 10 and 10a can be locked together by sliding the upper container 10a rightwardly with respect to the lower container 10 (as viewed from the back). By so sliding the container 10a, the boss 28 slides from right to left within the horizontal leg of the L-shaped slot 120a. A nib 124a, centrally located on and impinging in the horizontal leg of the L-shaped slot 120a acts as a cam on the bearing surface provided by the boss 28. As the boss 28 slides over the nib 120a, the nib 120a and the part of the back member 26a with which it is integrally associated, are displaced slightly downwardly. When the boss 28 has passed, the nib 120a and the part of the back member 26a with which it is associated, snaps back into its original position thereby locking the boss 28 and thus the container 10 with which it is associated into position with respect to the other container 10a. In this locked position, the respective side panels of the two containers 10 and 10a would be substantially in the same planes.

The two stacked containers 10 and 10a are unlocked and unstacked inversely as above described.

Referring to FIG. 7, a cross-sectional view of a container body 12 cut longitudinally through a keyhole boss 28, illustrates additional detail of the back member 26. The back member 26 is formed in cross-section to define an internal step 126 which extends laterally across the back member 26 between the border strengthening ribs, that is, those ribs which are integral with the side panels 20 and 22, as well as additional inboard strengthening ribs (such as 116) which extend in a parallel vertical fashion and which are integral with the back wall 16. The step 126 is spaced rearwardly from the upper edge of the rear panel 16 to define a laterally extending groove 50 which serves as a track for the cover 14 as hereinabove described.

A horizontal strengthening rib 128 extends further rearwardly than the others 116 by the thickness of the hatch 38 wherein the lowermost surface of the rib 128 is adjacent to the upper edge of the hatch 38 when in the closed position preventing foreign matter from entering.

Figure 8:
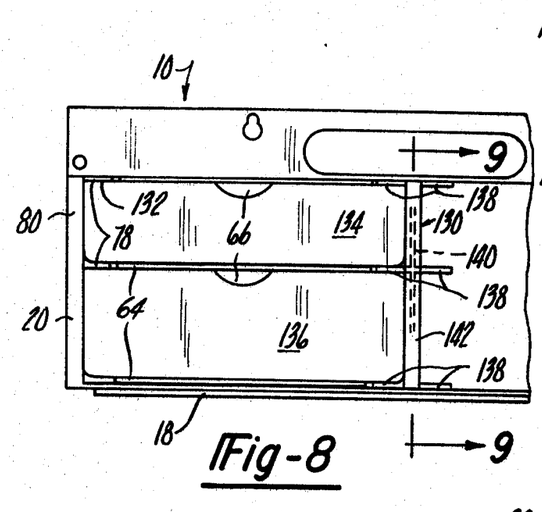
FIG. 8 is a broken front plan view of the storage container with the cover removed in the alternative configuration employing an insert associated with one side panel and a second partition insert intermediately spaced between the side panels and "partial" drawers.

Referring to FIG. 8, a final alternative configuration is illustrated which comprises a partitioning insert 130, a drawer insert 132 and two "partial" drawers 134 and 136. Drawer insert 132 is substantially similar to drawer insert 54 with the exception that it only has two horizontal runners 78. Insert 132 is downwardly slidably installed into the container body 12 adjacent to side panel 20 and is secured by the wraparounds 80. The two vertically spaced horizontal runners face inwardly and provide bearing surfaces for the drawers 134 and 136. Partitioning insert 130 comprises a planar vertical member 140 of substantially the same dimensions as the side panels 20 and 22, three integral planar vertically spaced horizontal runners 138 each of which project laterally outwardly from each side of the planar member 140, two elongated vertical reinforcing ribs 142 which are integral with the forwardmost and rearwardmost vertical edges of the member 140, forming an I in cross-section with the member 140 when viewed downwardly, and three integral mounting tabs 144, 146 and 148 the details and function of which will be discussed below. It is contemplated that planar vertical member 140 may have apertures located between the vertically spaced runners 138 to reduce the amount of material required and weight associated therewith.

Partitioning insert 130 is secured by receiving slots 84$_{2a}$, 84$_{2b}$ and 84$_{2c}$, substantially subdividing the volume defined by the container body 12, the planar member 140 of the insert 130 being substantially parallel with the side panels 20 and 22. The inserts 130 and 132 provide bearing surfaces for two "partial" drawers 134 and 136 of equal base area which are open at the top and have a bottom that is slightly smaller dimensionally than that portion of the floor 18 of the container body 12 situated between the inserts 130 and 132. Each drawer comprises said bottom and integral upstanding front wall, back wall and laterally opposed side walls. Both drawers 134 and 136 are molded plastic. In the closed position, the two drawers 134 and 136 are stacked vertically, spaced by the bearing surfaces of the inserts 130 and 132 having a combined vertical wall height of slightly less than the height of the side panels 20 and 22. The walls of the upper drawer 134 are substantially shorter than those of the lower drawer 136. Both drawers 134 and 136 have laterally truncated reinforcing ribs 64, a plurality of spaced vertical slots 72, semicircular handle reliefs 66 and centered U-shaped reliefs 94, to facilitate stacking as described above.

The runners 78 and 138 of the inserts 132 and 130 respectively restrict the displacement of the drawers 134 and 136 to an inward and outward sliding motion in the same manner as were the drawers 58 in the three-drawer configurations discussed above. The bottom surface of the inside end of the lower drawer 136 and both ends of drawer 134 are supported in the same manner as are the top two drawers 58 in the three-drawer configuration. The outside end of drawer 136 is supported on its laterally outsidemost ribs 64 as are both ends of the lowermost drawer 58 in the three-drawer configuration. The top surface of the uppermost runners of the inserts 130 and 132 likewise provide additional bearing surfaces for the cover 14 and prevent entry of foreign materials. Although only two drawers are illustrated, more or fewer could be employed by altering the drawer size and insert runner spacing without violating the spirit of the invention.

Figure 9:
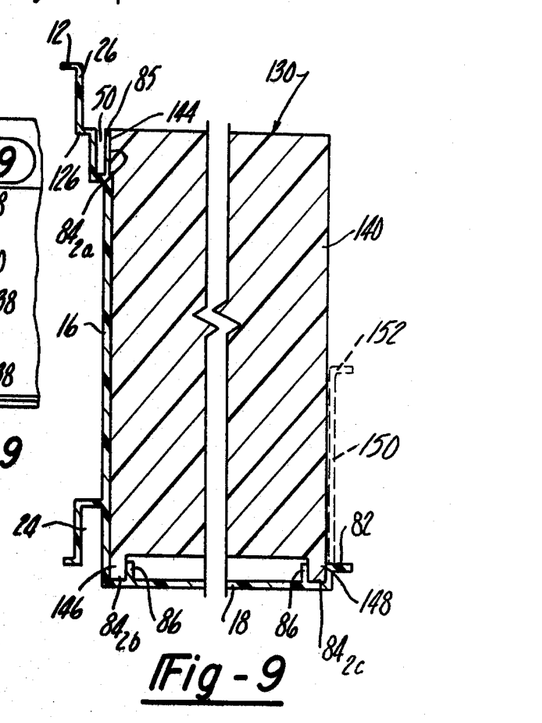
FIG. 9 is a sectional side view of the container body and partitioning insert in FIG. 8, additionally showing a partial front panel in phantom.

Referring to FIG. 9, a sectional view of the partition insert 130 installed in the container body 12 reveals the detail of the mounting tabs 144, 146 and 148. The partition insert 130 has three integral coplanar tabs 144, 146 and 148. Tab 144 projects rearwardly from the uppermost part of the rear vertical edge of the partition insert 130. The rearwardmost surface of tab 144 abuts with the membrane wall 85 in the slot $84_{2a}$. The wall 85 prevents entry of water and foreign material through the slots $84_{1a}$, $84_{2a}$ and $84_{3a}$ as well as preventing tab 144 from interfering with the lateral sliding motion of lip 48 of the cover 14 along guide groove 50. It is contemplated that the wall 85 is optional and can be eliminated as long as the tab 144 does not project rearwardly through the slot $84_{2a}$ sufficiently to interfere with the travel of cover 14 along guide groove 50. The lowermost surface of the tab 144 slopes slightly downwardly to the rear, abutting with the bottom surface of the notch $84_{2a}$ which is similarly slightly sloping downwardly to the rear, effectively hooking the insert 130 to the container body 12 preventing horizontal displacement. Tab 146 projects downwardly from the rearwardmost bottom edge of the insert 130, mating with slot $84_{2b}$ of the container body 12. Tab 148 projects downwardly from the forwardmost bottom edge of the insert 130, mating with slot $84_{2c}$ of the container body 12. The lateral inside surfaces of the slots $84_{2a}$, $84_{2b}$ and $84_{2c}$ abut the respective lateral sides of tabs 144, 146 and 148, thereby preventing any lateral movement of the insert 130 with respect to the container body 12 in the installed configuration. The unused sets of slots $84_{1a}$, $84_{1b}$ and $84_{1c}$ and $84_{3a}$, $84_{3b}$ and $84_{3c}$ would identically accept insert 130 constituting another heretofore undescribed alternative configuration if drawers of appropriate dimensions were provided. Due to the great number of possible alternative applications, for simplicity only the above enumerated four alternatives will be described in detail, keeping in mind that many other variations are contemplated.

An alternative partial front panel 150 of the container body 12 is illustrated in phantom, the application of which is discussed in detail below. The front panel 150 is integral with the container body 12, is planar, vertically orientated and runs laterally the entire length of the container body 12 terminating integrally at each end with the respective forwardmost vertical edge of the side panels 20 and 22. The front panel 150 is illustrated as being approximately one half the height of the side panels 20 and 22 but it is contemplated that it could be any intermediate height depending upon the principal intended application. The top vertical edge of the front panel 150 terminates in an integral forward facing continuous lateral cover support rib 152. In this configuration, the vertical plane of the cover 14 is abbreviated heightwise so that the combined height of the front panel 150 and the vertical plane of the cover 14 is substantially the same as the height of the side panels 20 and 22. As likewise described above, the lower horizontal edge of the vertical plane of cover 14 terminates in a lip 52 which wraps around and cooperates with the cover support rib 152, the lowermost surface of rib 152 providing a bearing surface for the uppermost surface of lip 52. The cover 14 is thereby restricted to lateral displacement.

Figures 10, 11:
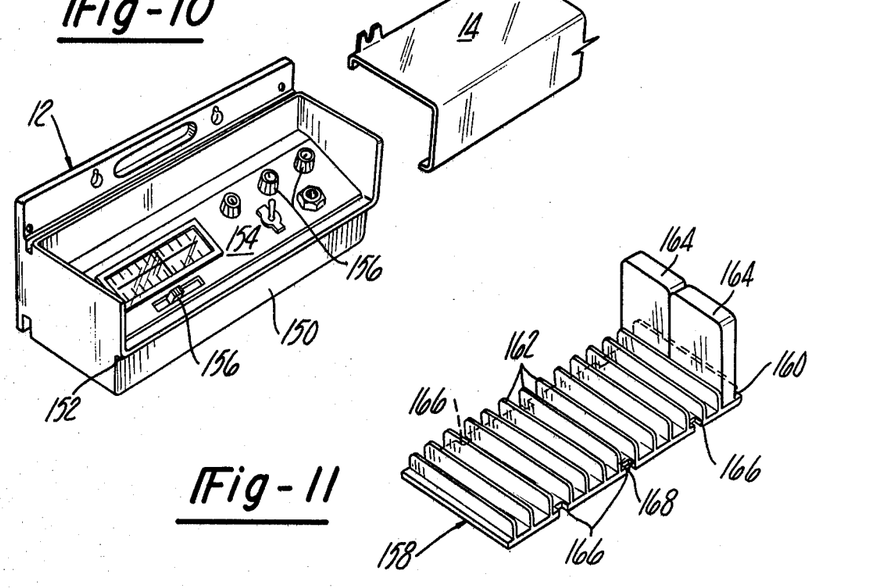
FIG. 10 is a perspective view of the container body with a piece of portable electronic equipment installed in it with the cover removed.
FIG. 11 is a perspective view of the tape cassette insert.

Referring to FIG. 10, an application of the above described container body 12 having a partial front panel 150 is illustrated. A portable electrical or electronic instrument 154 is installed within the container body 12, substantially filling its volume while providing clearance for any protuberant control parts 156 or the instrument 154. Once so installed, the container body 12 acts as a highly portable cabinet for the instrument 154. The cover 14 can close the container 10 when the instrument 154 is not in use thereby providing security (locking) and preventing entry of foreign material. The instrument 154 can thereby be stacked and/or wall mounted in conjunction with other instruments or containers serving other applications. Examples of such use would be a multifunction volt-ohm-meter in conjunction with a tool box for automotive troubleshooting or a depth-finder in conjunction with a fishing tackle box.

Referring to FIG. 11, a recording tape cassette insert 158 is illustrated, adapted for use within the container body 12 to provide a recording tape cassette storage device. The cassette insert 158 comprises a planar horizontal base part 160 and a plurality of integral, vertical spaced dividers 162. The base part 160 is dimensionally slightly smaller than and the same shape as the recessed portion of the floor 18 of the container body 12. The base part 160 is substantially the same thickness as the depth of the vertical recess of the floor 18 below the bearing surface 82 of the container body 12. Accordingly, the topmost surface of the base part 160 is flush with the topmost surface of the elevated bearing surface 82 of the container body 12 when the cassette insert 158 is installed therein. This relationship will be illustrated in greater detail below.

The dividers 162 are parallel to one another and spaced laterally along the surface of the base 160. When installed within the container body 12, the dividers 162 are substantially parallel to the side panels 20 and 22 of the container body 12. Each pair of adjoining dividers 162 are so spaced as to accept a standard recording tape cassette 164 between them. The overall dimensions of the container 10 in the preferred embodiment are such as that two cassettes 164 placed on their shorter edges with their longer edges adjoining one another, substantially fills the area of container 10 heightwise and depthwise (when viewed in lateral cross section). This spacial relationship will be discussed in detail below. Accordingly, when two cassettes 164 are orientated between each adjoining pair of dividers 162 and between the outside most surface of the endmost dividers 162 and the inside surface of the side panels 20 and 22, the volume defined by the container body 12 and the cover 14 is substantially filled.

A plurality of C-shaped reliefs 166 are spaced along the front and rear edges of the base 160 of the cassette insert 158. Each of the reliefs 166 cooperate with and provide clearance for one of the C-shaped bosses 86 in the container body 12 when the insert 158 is installed within this container body 12. The reliefs 166 are so dimensioned as to closely fit around the outside peripheral surfaces of the C-shaped bosses 86. One or more integral nibs 168 are provided within the peripheral surface of the reliefs 166 so as to provide an interference fit with the respective boss 86 upon installation of the insert 158. This nib 168 prevents disorientation of the insert with regard to the container body 12 during use or shipment. The insert 158 is formed of molded plastic or the like.

Figure 12:
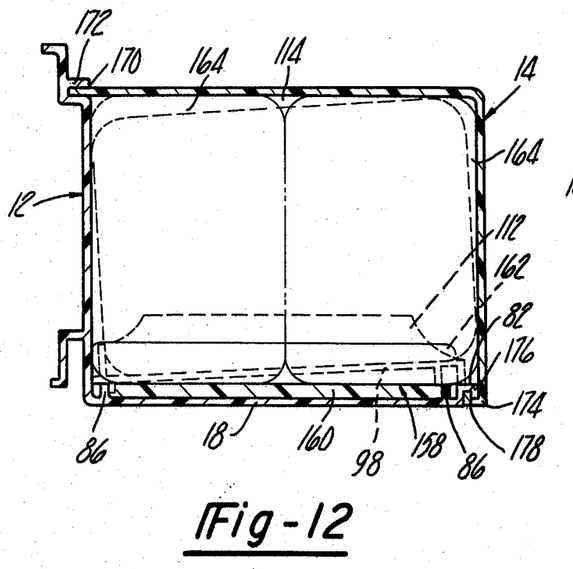
FIG. 12 is a section view of the container body and cover cooperating in an optional configuration, illustrating the spacial relationship of the container body, cover, tape cassette insert with cassettes and (in phantom) superimposed tape cartridge insert with a cartridge.

Referring to FIG. 12 an end view cross section of the container 10 illustrates the spacial relationship of the container body 12, cover 14, the cassette insert 158 with cassettes 164 and alternatively (in phantom) the tape cartridge insert 98 with a cartridge 114. Because the two tape cassettes 164 substantially fill the cross section area of the container 10 when the cassette insert 158 is installed, the vertical height of the dividers 162 required to retain them in place is minimized, even in the situation where only one cassette 164 is installed. The same is true for the cartridge 114 which when inserted between two partitions 112 substantially fills the cross section area of the container 10. The design of the cartridge insert 98 which tips the cartridge 114 it contains rearwardly, creates a fixed spacial relationship between the cassette configuration and the cartridge configuration wherein either will nest within the container 10 with very little wasted or unusable space. This close spacial relationship eliminates the need for extremely tall dividers which were necessary in the prior art to prevent the cassettes 164/cartridges 114 from becoming disoriented while being transported. The design represents a minimization of space, material and weight while retaining maximum versatility for other applications.

FIG. 12 additionally illustrates an alternative cover 14 design wherein the horizontal plane of the cover 14 slidingly cooperates with a forward opening slot 170 which runs laterally the entire length of the container body 12. Part of the slot 170 is formed by a cover retaining rib 172 which serves to prevent foreign bodies from entering the container 10 as well as preventing vertical displacement of the cover 14. The vertical plane of the cover 14 terminates along its lower edge in an integral inward turning U-shaped channel portion 174. A cover retaining rib 176 emanates downwardly from the forwardmost part of the lowermost surface of the elevated bearing surface 82 which slidingly cooperates with a slot 178 formed by channel 174. Both cover retaining ribs 172 and 176 run laterally the entire length of the container body 12. The forwardmost surface of the rearwardmost portion of the U-shaped channel 174 slidingly abuts with the rearwardmost surface of rib 176, thereby preventing all but lateral displacement of the cover 14. It is contemplated that any number of variations of the sliding cover 14 can be made from the two illustrated embodiments. They are intended to be illustrative rather than limiting in nature.

Figure 13:
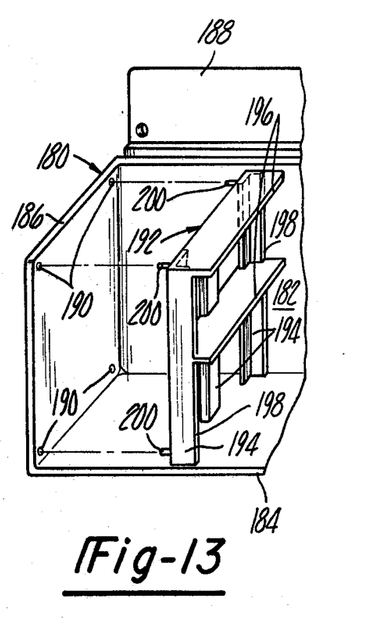
FIG. 13 is a broken perspective view of the container and an alternative drawer guide insert and insert receiving means.

Referring to FIG. 13, an alternative means for receiving removable inserts is illustrated, comprising a container body 180 having a rear panel 182, a floor 184, two side panels 186 and an upstanding rear member 188. Each side panel 186 has four spaced apertures 190, one in each of its four corners. This alternative embodiment further comprises two inserts 192, each of which associates with and attaches to one of the side panels 186. Both inserts 192 comprise three spaced planar elongated vertical members 194 integrally interconnected by two vertically spaced horizontal runners 196. The outside vertical edges of the two endmost vertical members 194 of each insert 192 terminate in integral bearing members 198. Four post bosses 200 face laterally outwardly from each insert 192, each of which are spaced and dimensioned to correspond with a respective aperture 190. The bosses 200 are slightly larger than their respective apertures 190 so as to provide an interference fit when snapped together. When installed with its respective side panel 186, each insert 192 functions in the same fashion as does the preferred embodiment described above. It is contemplated that the post boss and aperture mounting method can be applied to any of the embodiments described above that employ drawers in place of the wrap-arounds 80. The bearing members 198 function as does the forwardmost vertical surfaces of the wrap-arounds 80 in guiding the cover 14.

In actual practice, it has been found that the use of an opaque plastic material for the container body 12 and internal parts (drawers and inserts) and a translucent plastic material for the cover 14 produces a pleasing, functional combination. In addition, it is to be understood that various materials, as well as shapes and sizes, may be selected for the components and dimensions of the storage container 10, these and other modifications being of such a nature as to be variously apparent to those skilled in the art. Accordingly, it is to be understood that the foregoing specification is illustrative, rather than limiting in nature.

The embodiments of the invention in which an exclusive property or privilege is claimed are defined as follows:

1. A multipurpose, internally alterable, utility storage container comprising: a container body having laterally opposed side panels and at least one body panel, said body panel being disposed perpendicularly to and integral with said side panels, thereby retaining said side panels in a spaced substantially parallel relationship; a cover, movably disposed over the open portion of said container body, to open and close the container body; and an insert receiving system comprising a plurality of spaced slots and apertures integral with said side panels and interior of said body for receiving removable inserts for horizontal and vertical compartmentalization within the body, said inserts having integral bosses, tabs and ribs which matingly cooperate with said slots and apertures, whereby the interior of said body may be reconfigured by insertion and removal of drawers and inserts.

2. The apparatus as defined in claim 1 wherein said container body has a bottom, rear panel and an upstanding back member, the height of the back member exceeding that of the side panels, the top and front of the container body being substantially open.

3. The apparatus as defined in claim 1 wherein said cover comprises integral top and front planes, said cover being slidably disposed on the body for lateral movement over the side panels.

4. The apparatus as defined in claim 1 wherein the system for receiving inserts are wrap-arounds integral with the side panels which wrap inwardly from the front and rear vertical edges of said side panels.

5. The apparatus as defined in claim 2 wherein said upstanding back member has a slot which opens to the bottom of said back member, said slot having a width of slightly more than the thickness of the portion of said upstanding back member that exceeds the height of said side panels thereby allowing a plurality of storage containers to be stacked in a vertical array.

6. The apparatus as defined in claim 2 further comprising a plurality of key-way extrusions which provide for wall mounting of said container and simultaneous interlocking with another said container in a vertical array.

7. The apparatus as defined in claim 2 wherein said body further comprises stiffener ribs formed integrally with said back member and externally of said container, said ribs extending rearwardly of said rear panel.

8. The apparatus as defined in claim 7 further comprising a rear compartment hatch which is hingedly attached to the lowermost extension of said ribs and encloses a volume defined by the rearwardmost surface of the rear panel, the forwardmost surface of said rear compartment hatch and said reinforcement ribs.

9. The apparatus as defined in claim 8 further comprising a single locking means which secures said rear compartment hatch and cover to the container body simultaneously.

10. The apparatus as defined in claim 4 further comprising inserts having elongated vertical parts which slidably engage said wrap-arounds and a plurality of planar horizontal runners which are vertically spaced, interconnecting said vertical parts and extending inwardly, providing bearing surfaces.

11. The apparatus as defined in claim 10 further comprising a plurality of drawers which are open at the top, having a wall height of slightly less than the vertical spacing of the runners of said inserts, the laterally opposite portions of the drawer bottom resting upon said bearing surfaces wherein, in the fully assembled configuration, the drawers are restricted to inward and outward horizontal displacement when said cover is open, and immobile with relation to the rest of the container components when said cover is closed.

12. The apparatus as defined in claim 11 wherein said drawers each have a channel in its rear wall which opens to the bottom of said rear wall said slot being slightly wider than the thickness of that portion of said upstanding back member which exceeds the height of said side panels whereby any of said drawers can be downwardly mounted on and supported by said upstanding back member when said cover is open, closed or in any intermediate position.

13. The apparatus as defined in claim 12 wherein said bottom further comprises an integral recessed part and a bearing part peripheral to said recessed part whereby a sub-compartment is formed between the bottommost surface of the bottommost drawer and the upper surface of said bottom.

14. The apparatus as defined in claim 1 further comprising a recording tape cartridge storage tray comprising a bottom, an integral upstanding back part, a plurality of integral laterally spaced vertical partitions and integral laterally disposed front and rear leg ribs, the said front ribs being of greater vertical dimension than said rear rib whereby the tray tips rearwardly when resting on a horizontal surface or within said container body, being at all times supportive of any cartridges therein contained.

15. The apparatus as defined in claim 14 wherein said front and rear leg ribs cooperate with said means for receiving inserts, when said tape tray has been installed within said body restricting all but upward displacement.

16. The apparatus as defined in claim 2 wherein the system for slidably receiving inserts are wrap-arounds integral with the side panels which wrap inwardly from the front and rear vertical edges of said side panels; furthermore, other said system means for slidably receiving inserts are a plurality of spaced apertures in the bottom and upstanding rear panel of said container body.

17. The apparatus as defined in claim 16 further comprising a first insert having elongated vertical parts which slidably engage said wrap-arounds on one of the side panels and a plurality of planar horizontal runners which are vertically spaced, interconnecting said vertical parts and extending inwardly, providing bearing surfaces; and a second insert having a vertical partitioning part, a plurality of integral horizontal runners which are vertically spaced normal to said partitioning part and extending outwardly towards corresponding vertical parts on said first insert, and a plurality of mounting tabs integral with said vertical part, which slidingly engage said spaced apertures which restrict said second insert to upward displacement when installed in its design location.

18. The apparatus as defined in claim 17 further comprising a plurality of drawers which are open at the top, having a wall height of slightly less than the vertical spacing of the runners of said inserts, the sidemost portions of the drawer bottom resting upon said bearing surfaces, wherein in the fully assembled configuration the drawers are restricted to inward and outward horizontal displacement when said cover is open, and immobile with relation to the rest of the container components when said cover is closed.

19. The apparatus as defined in claim 1 further comprising a recording tape cassette storage tray comprising a base and a plurality of integral laterally spaced vertical partitions wherein the base of the tray is horizontal when resting on a horizontal surface or within said container body, being at all times supportive of any cassettes therein contained.

20. The apparatus as defined in claim 19 further comprising retaining means which cooperates with said system integral with said side panels and interior of said body for receiving removable inserts thereby holding said retaining means in a fixed orientation with respect to said container body.

21. The apparatus as defined in claim 1 wherein the system for receiving inserts is at least one aperture in each of said side panels.

22. The apparatus as defined in claim 21 further comprising inserts having elongated vertical parts, mounting means which cooperate with said apertures in said side panels and a plurality of planar horizontal runners which are vertically spaced, interconnecting said vertical parts and extending inwardly, providing bearing surfaces.

23. The apparatus as defined in claim 22 further comprising a plurality of drawers which are open at the top, having a wall height of slightly less than the vertical spacing of the runners of said inserts, the laterally opposite portions of the drawer bottom resting upon said bearing surfaces wherein, in the fully assembled configuration, the drawers are restricted to inward and outward horizontal displacement when said cover is open, and immobile with relation to the rest of the container components when said cover is closed.

24. The apparatus as defined in claim 23 wherein said container body, cover, inserts and drawers are molded of plastic or the like.

25. The apparatus as defined in claim 1 wherein said container body has a bottom, rear panel, front panel, and an upstanding back member, the height of the back member exceeding that of the side panels and said front panel, the top of the container being substantially open.

26. The apparatus as defined in claim 25 wherein said side panels exceed the height of the front panel.

27. A utility storage container comprising: a container body having laterally opposed side panels and an upstanding back member, the height of the back member exceeding that of the side panels; and a drawer having integral stacking means whereby said drawer can be slidably disposed within said container body, then removed and stacked upon said container body in a vertical array, said stacking means cooperating with and being supported by the portion of said upstanding back member that exceeds the height of said side panels.

28. The apparatus as defined in claim 27 wherein said container body and drawer are made of molded plastic or the like.

29. An insert for use within a multipurpose, internally alterable storage container having a body with laterally opposed side panels and an insert receiving system of integral spaced slots and apertures, said insert comprising: a plurality of spaced elongated vertical parts; and a plurality of planar horizontal runners having upper and lower surfaces, said runners being vertically spaced and interconnecting said vertical parts, said runners projecting laterally outwardly from said vertical parts, said upper and lower surfaces constituting bearing surfaces for drawers.

30. The apparatus as defined in claim 29 further comprising mounting means, said mounting means being integral with said insert.

* * * * *